United States Patent Office 2,786,529
Patented Mar. 26, 1957

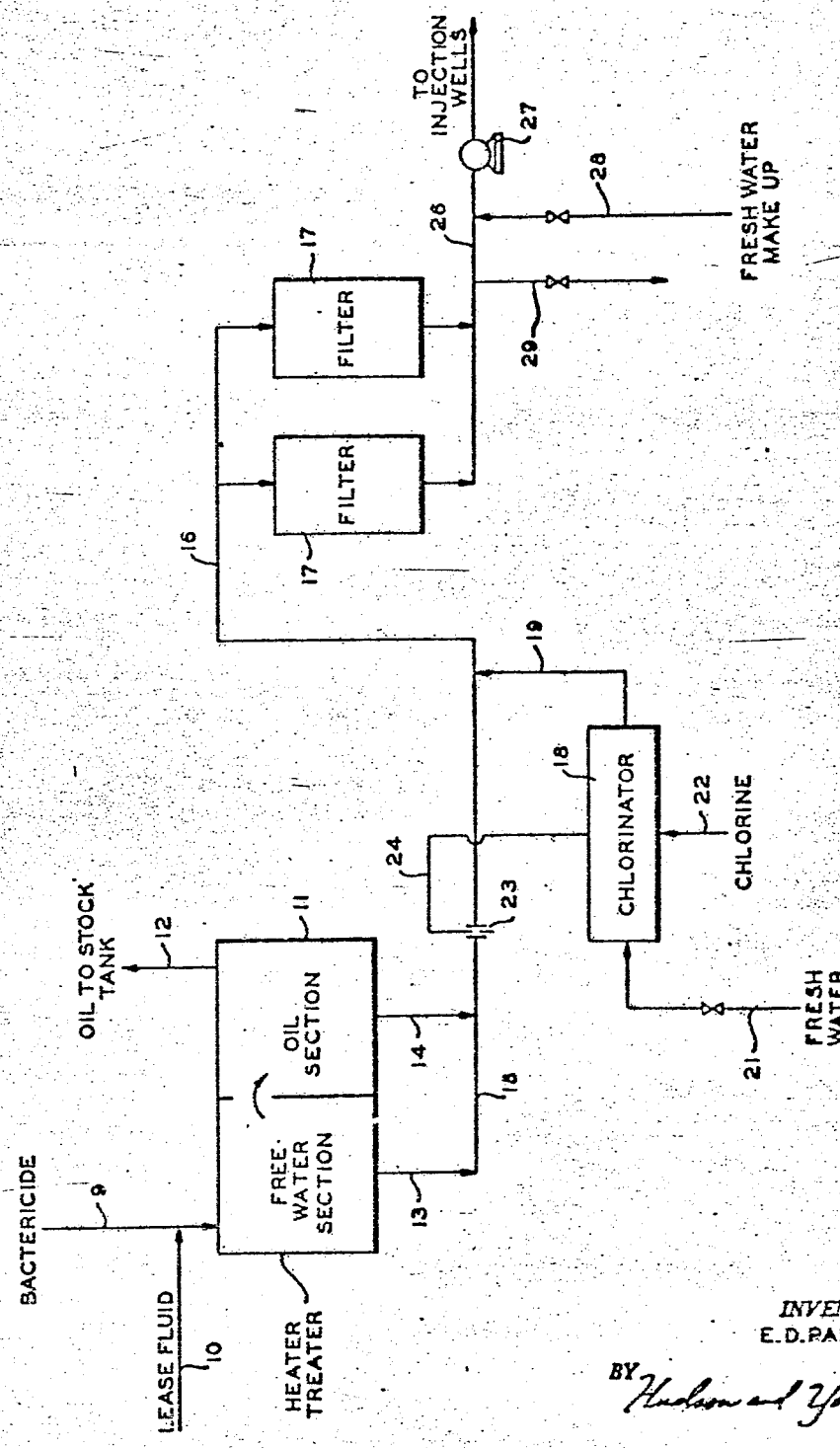

2,786,529

WATER TREATMENT

Edwin D. Parsons, Bartlesville, Okla., assignor to Phillips Petroleum Company, a corporation of Delaware Application August 19, 1953, Serial No. 375,105

16 Claims. (Cl. 166—7)

This invention relates to water treatment. In a further aspect this invention relates to a method for secondary recovery of oil from oil bearing formations. In a further aspect this invention relates to particular treatment of the water which is returned to the formation. In a further aspect this invention relates to a method for controlling the sulfide ion concentration of water which is recovered with the oil by adding an oxidizing agent, such as chlorine, to the water before returning it to the formation.

The use of water to reflood or pressure oil bearing formations has come into wide use by the oil industry. In such operation, the liquid from the well is separated to give an oil fraction and a water fraction. This water is then forced into the formation in order to make possible the recovery of further oil. This process, though quite simple in operation, has posed many new problems. One of the most important of these problems is clogging of the formation as a result of materials which are injected with the water into the ground.

It has been suggested that filters be used to remove these objectionable materials. Filters, however, are not the complete answer to the problem. Ferrous sulfide is one of the materials which has caused the greatest trouble. Even though the water removed from the oil may appear to be clear and colorless, the presence of ferrous ions and sulfide ions will lead to the formation of a precipitate after a period of time. With one particular well, a sample of the water removed from the well becomes gray after standing about 30 minutes, and after standing overnight a precipitate of black ferrous sulfide will be found on the bottom of a container. If such water is injected into a formation, the ferrous sulfide precipitate will plug the injection wells of the reservoir.

Addition of an oxidizing agent to this water will oxidize the sulfide ion and prevent the formation of ferrous sulfide. However, simple addition of such an oxidizing agent is not the complete answer to the problem. If too much oxidizing agent is injected into the water stream, ferrous ions will be oxidized to the ferric state. This ferric iron then forms ferric hydroxide which is very difficult to remove by filtration in a closed system.

Another possible solution to such a problem, and one that is commonly used in water treatment, is the addition of an oxidizing agent, or simply aeration to oxidize sulfide ions in the water. Using such a system with settling tanks, there would be no problem if the oxidation were carried to a point where iron was oxidized to the trivalent state. Large settling tanks could be provided and the water could be removed from these tanks by decantation and filtered. However, such a system is not desirable in a water injection process, mainly because a large investment is required to construct and maintain the water settling tanks.

Each of the following objects is obtained by at least one of the aspects of this invention:

An object of this invention relates to a method of and and apparatus for water treatment.

A further object of this invention relates to a process for secondary oil recovery by water injection.

A further object of this invention relates to a method of water treatment where water recovered with oil is injected into the formation.

A further object of this invention is to provide a method for sulfide ion control to prevent precipitation of undesirable materials in the injection wells of the reservoir.

Other objects and advantages of this invention will be apparent to one skilled in the art upon reading the accompanying disclosure.

I have invented a process for water treatment which makes possible control of the sulfide ion concentration to prevent undesirable precipitate formation. This invention is illustrated in a modification applicable to the water flooding of oil reservoirs. The process of this invention lies in my discovery that the sulfide ion concentration should be maintained between the limits of 0 and 2.5 parts per million, preferably less than 1.5 parts per million. In other words, the sulfide ion concentration should be maintained low enough that ferrous sulfides are not formed and this is done by addition of an oxidizing agent to the water. However, and equally important, an excess of the oxidizing agent should not be used. This is because these waters frequently contain ferrous compounds and the addition of an excess of the oxidizing agent will convert such ferrous ions to the ferric state. The result is a ferric hydroxide precipitate which is not removed by the filters and, in general, is very difficult to handle in a closed system.

Oxidizing agents preferred for use in my invention are the halogens such as fluorine, chlorine and bromine and complexes thereof, i. e., a potassium iodide/iodine complex and the like. Chlorine, because of economic reasons and ease of handling, has been most used. In general, oxidizing agents are suitable if, as a result of their use, no precipitates which will clog the formations are formed.

The process is relatively simple and the first step comprises separating the water from the oil after it is recovered from the formation. After this separation, the oxidizing agent is added to the water upstream of the filters. Automatic means are provided for the introduction of this oxidizing agent. When using chlorine, it is introduced into a fresh water stream and this stream then contains hydrochloric acid and hypochlorous acid. The amount of chlorine introduced is proportional to the amount of water flowing to the filters, this being controlled by any suitable means. A commercial venturi meter inserted in the line extending to the filters offers a simple method of determining and controlling the amount of chlorine to be added.

Following the chlorine introduction, the water is filtered to remove suspended solids, such as corrosion products and insoluble precipitates formed upstream of these filters. After filtering, this water, with such additional water as is needed, is returned to the wells after being pressured to a suitable pressure.

The drawing illustrates diagrammatically a closed repressuring system employed in secondary recovery of oil from oil-bearing formations.

Referring now to the drawing, the fluid from the well comprising water and oil is conveyed through line 10 to an oil-water separator, such as a heater treater 11, the operation of such apparatus being well known to those skilled in the art. If desired, a bactericide may be added through line 9. From this treater, oil is removed through line 12 and water is removed through lines 13 and 14 extending from the lower end portion of separator 11. This water flows through lines 16 to filters 17, it being obvious that the number of filters required depends upon the size of individual filters. It is preferable to use more than one filter so that one can be cleaned while maintaining flow through the others. Chlorinator 18 injects a water stream, to which chlorine has been added, through line 19 into line 16. The water stream in line 19 is made up of fresh water supplied through line 21 and chlorine through line 22.

The amount of water containing chlorine injected into line 16 is controlled in response to liquid flow in water line 16 by means of a flow meter 23, this being connected to chlorinator 18 by means of line 24. After passing through filter 17, the water is conveyed to the injection wells through line 26, this stream being pressured to any suitable pressure by means of pump 27. Fresh water, as needed, can be added to line 26 through conduit 28. Conduit 29 provides means for removing samples of the water contained in line 26.

In order to further illustrate this invention, a series of tests were made on water obtained from the North Burbank Oil Field. The results of addition of different amounts of chlorine is set forth in the following table, the appearance being noted after the samples were allowed to stand overnight.

| Chlorine Dosage in Final Solution, p. p. m. | Appearance |
|---|---|
| 0.3 | Black ferrous sulfide on bottom. |
| 0.6 | Do. |
| 0.9 | Do. |
| 1.2 | Do. |
| 1.8 | Do. |
| 2.4 | Do. |
| 3.0 | Do. |
| 4.0 | Do. |
| 6.0 | No black ferrous sulfide. |
| 8.0 | Do. |
| 10.0 | No black ferrous sulfide, but some red ferric hydroxide present. |
| 23.5 | Red floc of ferric hydroxide. |
| 47.0 | Do. |

It will be noted that the proper range is fairly narrow, the correct chlorine dosage when dealing with this particular water sample being 6 to 8 parts per million.

As will be obvious to those skilled in the art, a statement of the amount of chlorine to be added means very little since it is dependent upon the sulfide ion concentration in the water. A particular water sample representative of water obtained from the North Burbank Oil Field has the following composition.

Table

| Component: | Parts per million |
|---|---|
| Total solids | 48,807 |
| Sodium and potassium | 14,637 |
| Calcium | 3,395 |
| Magnesium | .541 |
| Chloride | 30,129 |
| Bicarbonate | 50 |
| Sulfate | 24 |
| Barium | 27 |
| Sulfide | 4 |

The specific gravity of this water at 60° F. was 1.0328.

Generally, the sulfide ion concentration is relatively constant and does not vary greatly from day to day. However, where this value does vary, automatic control means are necessary to increase the amount of oxidizing agent supplied when the sulfide ion concentration increases. For such operation, instruments for automatic determination of the oxidation-reduction potential of the treated brine can be used to control the rate of addition of the oxidizing agent.

The filters used in the above described process can be of any standard design and are usually filled with coal or sand. When it is desirable to clean them, this can be done simply by backwashing. Where a bank of filters is used, the usual process is to pass all of the water through part of the filters while the balance are being washed.

The simplest test to determine if the proper amount of chlorine or other oxidizing agent is being added, is to remove a sample downstream of the filters. If the proper amount of chlorine has been added, there will be no precipitate, either black ferrous sulfide or red ferric hydroxide, at the end of a 24 hour period.

As many possible embodiments may be made of this invention without departing from the scope thereof, it is to be understood that all matter herein set forth, or shown in the accompanying drawing, is to be interpreted as illustrative and not as unduly limiting the invention.

I claim:

1. A method of treating water containing ferrous ions and sulfide ions which comprises adding an oxidizing agent to said water in an amount sufficient to maintain the concentration of said sulfide ions at less than 2.5 parts per million, but insufficient to oxidize said ferrous ions.

2. A method of treating water containing ferrous ions and sulfide ions which comprises adding chlorine to said water in an amount sufficient to maintain the concentration of said sulfide ions at less than 2.5 parts per million, but insufficient to oxidize said ferrous ions.

3. The method of claim 1 in which said oxidizing agent is added in an amount sufficient to maintain the sulfide ion concentration less than 1.5 parts per million.

4. The method of claim 2 in which chlorine is added in an amount sufficient to maintain the sulfide ion concentration less than 1.5 parts per million.

5. In a closed system water repressuring method for secondary recovery of oil from an oil-bearing formation, which method comprises, separation of oil and water produced from an oil-bearing formation, filtration of said water and injection of said water into an oil-bearing formation, and wherein said water contains sulfide ions and ferrous ions, the improvement which comprises: adding an oxidizing agent to said water prior to said filtration, said oxidizing agent being added in an amount sufficient to maintain the concentration of said sulfide ions at less than 2.5 parts per million, but insufficient to oxidize said ferrous ions.

6. The process of claim 5 in which the amount of oxidizing agent added is controlled automatically with respect to the water being filtered.

7. The method of claim 5 in which oxidizing agent is added in an amount sufficient to maintain the sulfide ion concentration less than 1.5 parts per million.

8. A method of controlling sulfide ion concentration in water which contains sulfide ions and ferrous ions so as to prevent the formation of insoluble ferrous sulfide which comprises adding an oxidizing agent to said water in an amount sufficient to maintain a concentration of said sulfide ions at less than 2.5 parts per million, but insufficient to oxidize said ferrous ions.

9. A method according to claim 8 wherein said oxidizing agent is chlorine.

10. A method according to claim 8 wherein said oxidizing agent is bromine.

11. A method according to claim 8 wherein said oxidizing agent is fluorine.

12. A method according to claim 8 wherein said oxidizing agent is a potassium iodide/iodine complex.

13. A method of treating water containing both ferrous ions and sulfide ions, which method comprises: measuring the concentration of sulfide ion in the treated water; adding an oxidizing agent to said water; and controlling the amount of said oxidizing agent added to said water responsive to said measurement, said amount being sufficient to maintain the concentration of said sulfide ions at less than 2.5 parts per million, but insufficient to oxidize said ferrous ions.

14. A method of treating water containing both ferrous ions and sulfide ions, which method comprises: adding an oxidizing agent to said water in an amount sufficient to maintain the concentration of said sulfide ion at less than 2.5 parts per million, said amount of oxidizing agent being insufficient to reduce the concentration of said ferrous ion.

15. The method of claim 14 wherein said oxidizing agent is chlorine.

16. A closed system method of treating water which is used as injection water in secondary recovery of oil from an oil bearing formation and which water contains both sulfide ions and ferrous ions, which method comprises: separating a stream of oil and water produced from an oil-bearing formation into a stream of oil and a first stream of water; adding an oxidizing agent to a second stream of water in an amount proportional to the volume of said first stream of water, said amount being an amount sufficient to maintain the concentration of said sulfide ions at less than 2.5 parts per million, but insufficient to oxidize said ferrous ions; combining said first and said second streams of water to obtain a combined stream of water; and filtering said combined stream of water.

References Cited in the file of this patent

UNITED STATES PATENTS

| | | |
|---|---|---|
| 1,100,675 | Hackl et al. | June 16, 1914 |
| 1,903,813 | Schwab | May 9, 1933 |
| 2,239,612 | Lawlor | Apr. 22, 1941 |
| 2,543,813 | Stover | Mar. 6, 1951 |

OTHER REFERENCES

The Oil and Gas Journal, July 28, 1945, pps. 157–158, "Chemical treatment for oil-field water for injection into the ground."

History of Water-Flooding of Oil Sands in Kansas, U. S. Dept. of Interior, R. I. 3761, July, 1944, pg. 42.

The Oil Weekly, April 2, 1945, pps. 40, 42, 44, 46, and 48, "Water flooding in Oklahoma."